Dec. 27, 1938.　　　R. A. GUIDROZ　　　2,141,530
TRACTOR
Filed Nov. 30, 1937　　　4 Sheets-Sheet 4
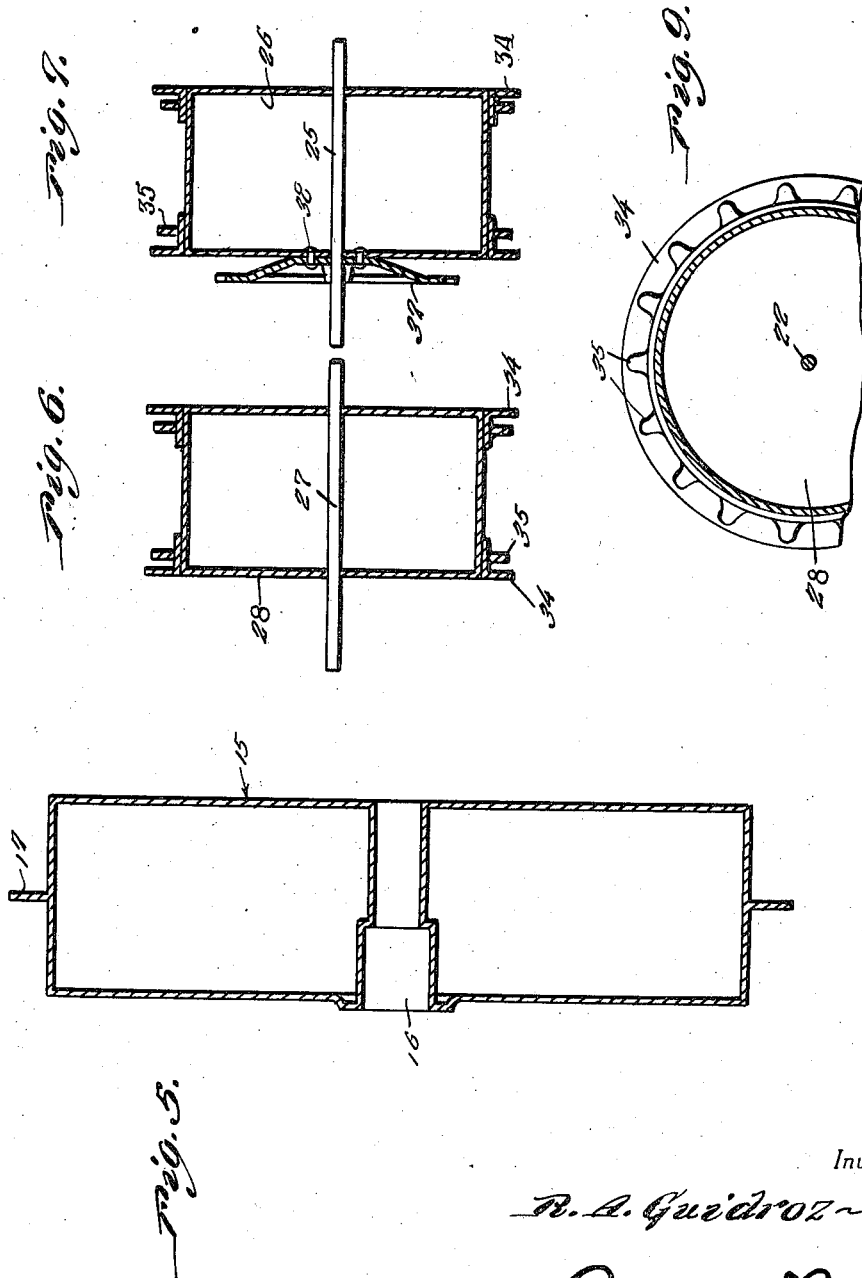
Inventor
R. A. Guidroz
By Clarence A. O'Brien
Hyman Berman
Attorneys Patented Dec. 27, 1938

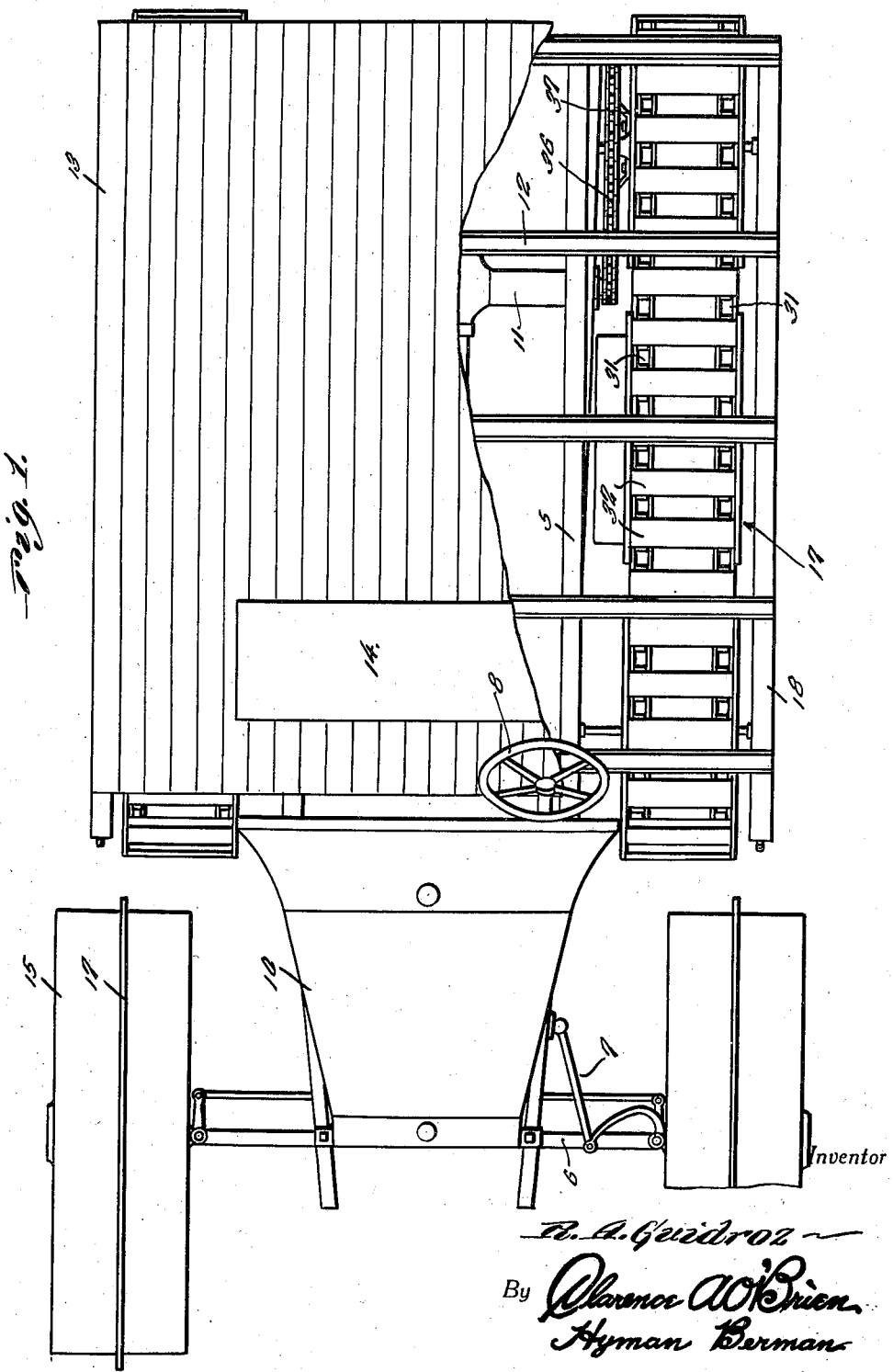

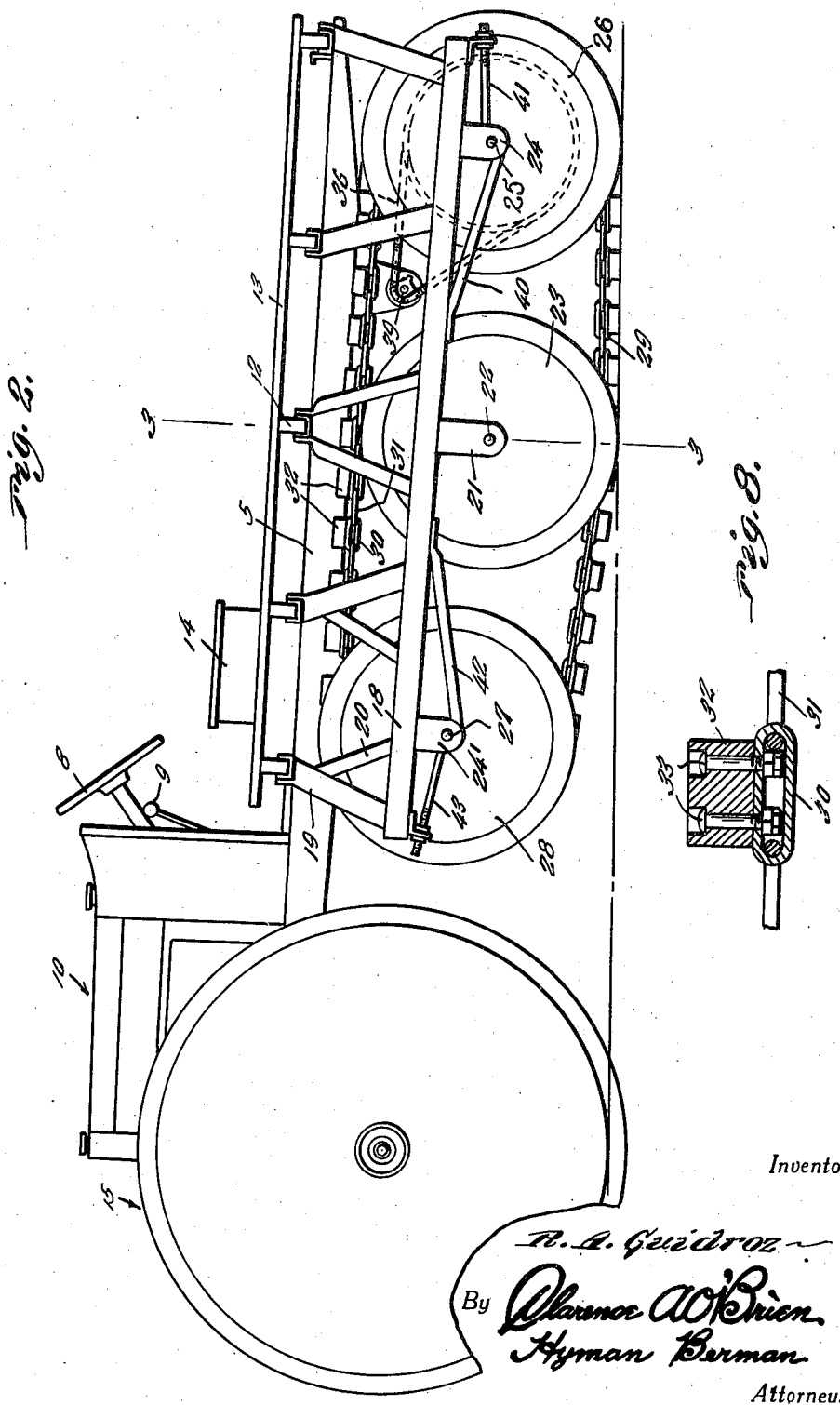

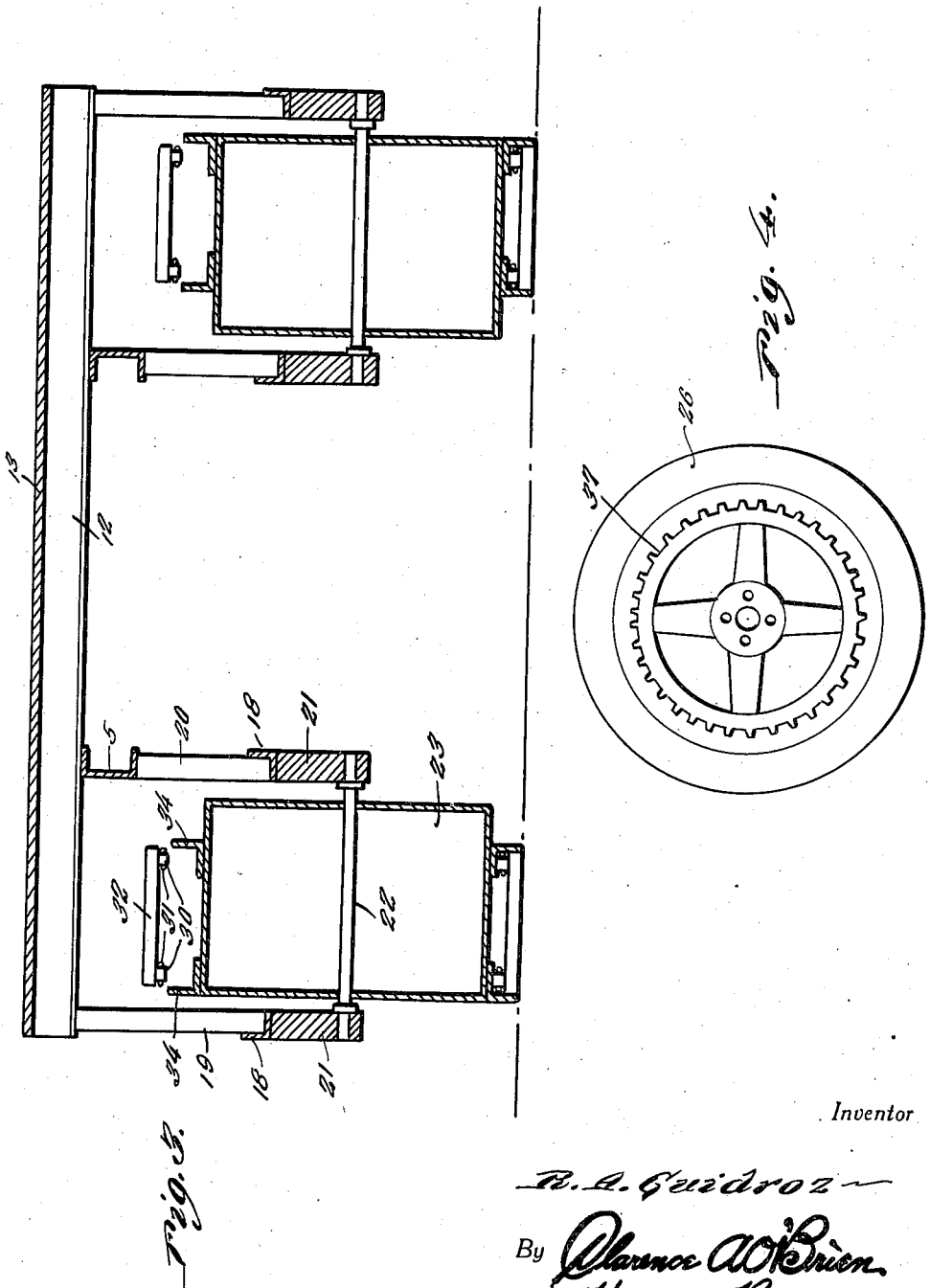

2,141,530

UNITED STATES PATENT OFFICE 2,141,530

TRACTOR

Romain A. Guidroz, Lockport, La., assignor of twenty-five per cent to Claude E. Daviet and twenty-five per cent to L. E. Daviet, both of Lockport, La.

Application November 30, 1937, Serial No. 177,307

2 Claims. (Cl. 180—9.1)

This invention relates broadly to tractors and an object of the invention is to provide a tractor particularly designed for use in marshlands.

In accordance with the present invention I provide a tractor embodying a conventional motor vehicle chassis frame, internal combustion engine, clutch and transmission mechanism together with improved traction elements whereby a tractor is provided that will be found especially useful when working in marshlands or where the ground is extremely soft.

The invention together with its objects and advantages will be best understood from a study of the following description taken in connection with the accompanying drawings wherein:—

Figure 1 is a top plan view of the tractor with certain parts broken away,

Figure 2 is a side elevational view of the tractor,

Figure 3 is a transverse sectional view taken substantially on the line 3—3 of Figure 2, Figure 4 is a side elevational view of a sprocket equipped drum member, Figure 5 is a vertical sectional view through one of the front traction wheels, Figure 6 is a transverse sectional view through a front drum forming part of a caterpillar traction device, Figure 7 is a view similar to Figure 6 but taken through the sprocket equipped rear drum member of a caterpillar traction device, Figure 8 is a fragmentary detail sectional view through a portion of an endless track forming part of the caterpillar traction device, and Figure 9 is a fragmentary detail sectional view through one of the drums forming part of a caterpillar traction device.

Referring to the drawings by reference numerals it will be seen that 5 indicates generally a conventional chassis frame of a motor vehicle such as for example a truck; while the reference numeral 6 indicates the front axle; the reference numeral 7 indicates generally the steering mechanism; the reference numeral 8 the steering wheel; the reference numeral 9 the gear shift lever; the reference numeral 10 the hood under which is confined the usual internal combustion engine, and the reference numeral 11 indicates the rear axle housing.

In accordance with the present invention there are mounted transversely of the chassis frame 5 stringers 12 which support a platform 13 formed of wood planks, or as otherwise found desirable. Suitably mounted on the platform 13 at the forward end thereof is a seat 14 for the occupant of the tractor.

Further in accordance with the present invention there is provided for the tractor front wheels 15. The wheels 15 are suitably provided as at 16 to accommodate the usual wheel spindles, the wheels 15 being mounted in substantially the same manner as the front wheels of a motor vehicle are mounted.

As shown, each of the wheels 15 is of material diameter and width and is in the form of a hollow, cylindrical drum having on its periphery, and extending circumferentially thereof a traction rib 17. The wheels 15 being thus constructed will have a certain amount of buoyancy thus rendering these wheels particularly desirable when the tractor is being used while working in marshy lands or soft ground.

Further in accordance with the present invention there is provided at opposite sides of the tractor caterpillar traction devices 17.

Since the traction devices 17 are identical in construction a detailed description of one will teach the construction of the other.

Thus it will be seen that each side of the tractor there is provided a pair of side rails 18—18, the outer side rail being suspended from the stringers 12 through the medium of suspension bars 19 while the inner rail 18 is suspended from the chassis frame 5 though the medium of suspension bars 20.

The bars 18 have depending from intermediate portions thereof bearings 21 in which are journaled the ends of a shaft 22 about which is rotatable a hollow drum 23.

Also adjacent the ends thereof the bars 18 have depending therefrom bearing brackets 24—24', and between the bearing brackets 24 at the rear end of the bars 18 is supported a shaft 25 on which is rotatable a hollow drum 26.

Journaled between the bearing 24' depending from the bars 18 adjacent the forward ends of the bars is a shaft 27 about which is rotatable a hollow drum 28.

Thus it will be seen that each caterpillar device 17 embodies three drums including an intermediate drum 23, an end drum 26, and an end drum 28; and trained over the drums 23, 26 and 28 is an endless track 29.

The track 29 as best shown in Figure 8 consists of two chains each comprising loop members 30 connected by links 31 in an endless series, and connecting the chains are traction lugs 32 secured to the loops 30 through the medium of bolts 33 as shown in Figure 8.

Each of the drums 23, 26 and 28 is provided on the periphery thereof with a pair of opposed circumferentially extending angle irons 34 that provide therebetween an annular channel for accommodating the track 29 and arranged within said channel of the drums 26 and 28 are opposed lugs 35 arranged in series circumferentially of the drums and with which the links 31 of the track engage. The drums 23 need not be provided with lugs, as shown in Figure 3.

Drive from the motor of the tractor is transmitted through the conventional transmission gearing, shafting and the like to the rear axle of the tractor, and from the rear axle of the tractor to the drums 26 of the caterpillars through the medium of chains 36 trained over sprockets 37 suitably mounted as at 38 on the inboard sides of the drums 26, and also over sprockets 39 provided on the ends of the rear axle. Thus it will be seen that as drive, in this manner, is transmitted to drums 26 the tracks 29 will be caused to move in their respective orbits for propelling the tractor.

Also, and as shown in Figure 2, the bearings 24 are suitably braced with respect to the bars 18 through the medium of braces 40 and adjustable braces 41. In a like manner are the bearings 24' braced with respect to the bars 18, namely through the medium of braces 42 and 43.

It will thus be seen that by having the wheels 15 of hollow drum-like construction, and also by having the drums 23, 26 and 28 of the respective caterpillar traction devices also of hollow drum-like construction said wheels and drums will have a certain amount of buoyancy and will thus better sustain the weight of the tractor when travelling over marshy or soft ground than would be the case of the wheels now generally employed as part of tractors now generally used.

It will be further appreciated that the forwardmost drums 28 of the caterpillars have their axles 27 on a plane above the axles of the drums 23, 26 so that the drums 28 are out of contact, normally, with the ground. The advantage of this arrangement is that with the forwardmost drums 28 raised above ground level steering of the vehicle and the turning thereof on soft ground is facilitated as is also the surmounting of obstructions in the path of the caterpillars. In this latter connection it will be appreciated that the forwardmost drums 28 will serve to pack any ground formations that would have a tendency to obstruct progress of the vehicle.

It is thought that a clear understanding of the construction, utility and advantages of a tractor of this character will be had without a more detailed description.

Having thus described the invention what is claimed as new is:—

1. A vehicle for use in marsh land and soft ground comprising a frame, a front axle supported by the frame, large drum-like wheels carried by the ends of the axle and of hollow construction, longitudinally extending side frames depending from side parts of the first-mentioned frame, front, intermediate and rear wheels carried by each side frame, each of said wheels being of hollow drum-like form and having flanges at its ends, an endless traction element carried by the wheels of each side frame, each element including a pair of endless chains and cross strips connected with the chains, annular rows of lugs between the flanges of the front and rear wheels carried by the side frames, engaged by the chains and means for rotating the rear wheels.

2. A vehicle for use in marsh land and soft ground comprising a frame, a front axle supported by the frame, large drum-like wheels carried by the ends of the axle and of hollow construction, longitudinally extending side frames depending from side parts of the first-mentioned frame, front, intermediate and rear wheels carried by each side frame, each of said wheels being of hollow drum-like form and having flanges at its ends, an endless traction element carried by the wheels of each side frame, each element including a pair of endless chains and cross strips connected with the chains, annular rows of lugs between the flanges of the front and rear wheels carried by the side frames, engaged by the chains and means for rotating the rear wheels, the front wheels of the side frames having their axes disposed in a plane above the axes of the intermediate and rear wheels and the wheels of the side frames being of considerably less diameter than the wheels carried by the front axle.

ROMAIN A. GUIDROZ.